March 17, 1931.     J. FOLMAN     1,796,925
METHOD OF MAKING SCREW DIES
Filed March 31, 1928

J. Folman
INVENTOR

By: Marks & Clerk
ATTYS.

Patented Mar. 17, 1931

1,796,925

UNITED STATES PATENT OFFICE

JÓZEF FOLMAN, OF SOSNOWIEC, POLAND

METHOD OF MAKING SCREW DIES

Application filed March 31, 1928, Serial No. 266,274, and in Poland December 17, 1927.

This invention relates to an undivided screw-die made in a single piece, which is easy to manufacture and is extremely efficient.

Screw-dies as hitherto made have various disadvantages; their construction is such as not to allow of the entire working surface being ground, which is an essential requirement of modern tools; the removal of shavings is rendered difficult in the screw-dies when in use and the openings provided for this purpose in the wall of the screw-die weakened the tool.

Furthermore the screw-dies as hitherto made were inconvenient and costly to tool.

Figure 1:
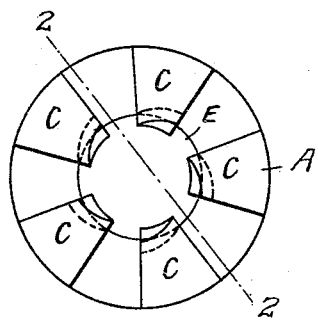
Figure 2:
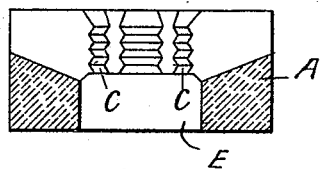
Figure 3:
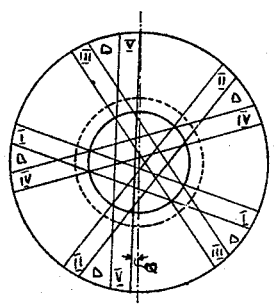
Figure 4:
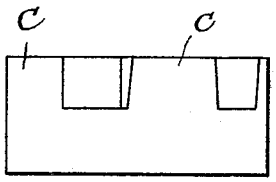

The present invention overcomes the drawbacks referred to and is illustrated in two constructional forms in the accompanying drawing, in which Fig. 1 shows the new screw-die in plan view, Fig. 2 a vertical section on line 2—2 of Fig. 1, Fig. 3 a projection of the tracks of the milling cutter and Fig. 4 a second constructional form of the screw-die.

As will be seen from the drawing, the screw-die according to the invention consists of a disc A which is provided with five screw cutting segments C. The depth of the incisions between the segments corresponds to about ½ to ¾ of the total height of the disc and at the same time equals the height of the thread. Below the incisions the thread is removed, so that a circular opening E is formed, the diameter of which is slightly larger than the external diameter of the thread. As is well-known the threads, through which the incisions pass, perform the actual work in every screw-die, while the remaining threads act partly as a guide, but partly render the work more difficult through unnecessary friction. As will be seen from the drawing, the number of additional threads beyond the incisions is reduced to a minimum. Instead of being deeper towards the centre as shown in Figure 2 the incisions may be straight across, that is to say of uniform depth.

For making the screw-die, a circular blank is turned off from a bar of steel of suitable diameter and a central hole is bored through it having a diameter equal to the base diameter of the thread. The disc is then counterbored to form a circular opening E (Fig. 2), the diameter of which somewhat exceeds the external diameter of the thread. A screw thread is then formed in the blank. After the formation of the screw thread, channels or grooves are machined in the face of the blank remote from the counterbore, these grooves extending to the counterbore.

The incisions are made by milling the disc five times by means of a flat milling cutter along the lines I, II, III, IV and V, Fig. 3; the segments D left after milling are cut away after tempering. For these considerations in tooling it is of advantage to make the screw-die in the form of a disc provided with five segments, as with any other number of segments the advantages of the new screw-die cannot be made full use of. With a milling cutter having five incisions, as the cutting surface of one segment is being formed, the rear surface of the opposite segment is formed.

As will be seen from the above, the entire working surface of the screw-die can be ground on an ordinary flat emery disc. By undercutting the segments C on the slant, which over such a small length will replace a helical cut, the power required for cutting a thread with the new screw-die is very small, the shavings being removed forwardly through the circular shape of the undercut portions.

The screw-die takes very little material for its manufacture, as its diameter need be no more than double the diameter of the thread plus 2 to 4 mm., since it is not necessary to provide any weakening openings for carrying away the shavings.

As will be seen from Fig. 3, in order to obtain the same cutting angle $\beta$ for screw-dies of all sizes, a milling cutter must be used, having a width proportionate to the outside diameter of the thread to be cut by the particular die. Thus, for instance, with $\beta = 6°$ (Fig. 3) the width of the milling cutter must be equal to 0.2 times the external diameter of the thread. If the width of the cutter is too great, the incisions made by the cutter will bevel off the cutting edges of the segments.

What I claim is:

1. In the method of manufacturing a single-piece screw cutting die from a die blank having a centre opening, the steps which consist in forming a screw thread in the blank, cutting a plurality of intersecting transverse incisions in one face of the blank right across the blank from one side to the other and having a depth equal at least to half the height of the die, so as to form a number of thread cutting segments equal to the number of incisions and an equal number of smaller segments between each adjacent pair of cutting segments, and removing said smaller segments, as and for the purposes set forth.

2. In the method of manufacturing a single-piece screw cutting die from a die blank having a centre opening, the steps which consist in forming a screw thread in the blank cutting five intersection incisions in one face of the blank right across the blank from one side of the blank to the other so as to form a number of thread cutting segments equal to the number of incisions and an equal number of smaller segments between each pair of cutting segments, and removing said smaller segments, as and for the purposes set forth.

3. In the method of manufacturing a single-piece screw cutting die from a die blank having a centre opening, the steps which consist in forming a screw thread in the blank cutting a number of intersecting incisions in one face of the blank by traversing a cutter right across the blank from one side of the blank to the other so as to form a number of thread cutting segments equal to the number of incisions and an equal number of smaller segments between each pair of cutting segments, hardening the blank and removing the said smaller segments, as and for the purposes set forth.

In testimony whereof I have signed my name to this specification.

JÓZEF FOLMAN.